(12) United States Patent
Nyfors et al.

(10) Patent No.: US 8,916,660 B2
(45) Date of Patent: Dec. 23, 2014

(54) METHOD FOR RECOVERING POLYMER AND APPARATUS THEREFOR

(71) Applicants: Klaus Nyfors, Porvoo (FI); Jari Aarila, Porvoo (FI); Jari Hatonen, Porvoo (FI); Henrik Andtsjo, Porvoo (FI); Eira Johansson, Porvoo (FI); Mikko Lylykangas, Vantaa (FI)

(72) Inventors: Klaus Nyfors, Porvoo (FI); Jari Aarila, Porvoo (FI); Jari Hatonen, Porvoo (FI); Henrik Andtsjo, Porvoo (FI); Eira Johansson, Porvoo (FI); Mikko Lylykangas, Vantaa (FI)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 14/237,366

(22) PCT Filed: Nov. 16, 2012

(86) PCT No.: PCT/EP2012/004779
§ 371 (c)(1),
(2), (4) Date: Feb. 6, 2014

(87) PCT Pub. No.: WO2013/075808
PCT Pub. Date: May 30, 2013

(65) Prior Publication Data
US 2014/0171611 A1    Jun. 19, 2014

(30) Foreign Application Priority Data
Nov. 21, 2011   (EP) .................................... 11009199

(51) Int. Cl.
*C08F 2/34*    (2006.01)
*C08F 6/00*    (2006.01)
(Continued)

(52) U.S. Cl.
CPC ................ *C08F 2/01* (2013.01); *B01J 8/1809* (2013.01); *B01J 8/003* (2013.01);
(Continued)

(58) Field of Classification Search
USPC ........................ 526/68, 920, 67; 422/131, 145
See application file for complete search history.

(56) References Cited

U.S. PATENT DOCUMENTS 3,595,840 A * 7/1971 Moberly et al. ................ 526/68
4,532,311 A   7/1985 Fulks et al.
(Continued)

FOREIGN PATENT DOCUMENTS

EP   0 499 759    8/1992
EP   0 560 035    9/1993
(Continued)

OTHER PUBLICATIONS

International Search Report mailed Feb. 15, 2013 for International Application No. PCT/EP2012/004779.
(Continued)

*Primary Examiner* — Fred M Teskin
(74) *Attorney, Agent, or Firm* — Fay Sharpe LLP

(57) ABSTRACT

Process and apparatus for recovering polymer from a gas phase reactor having a distribution plate via an outlet vessel comprising at least one apparatus for the breakup of polymeric agglomerates, the apparatus further comprising a feed pipe connecting the gas phase reactor and the outlet vessel a return gas line connecting the gas phase reactor and the outlet vessel, means for varying the flow rate through the return gas line from the outlet vessel to the gas phase reactor, and means for varying the outlet rate of polymer product from the outlet vessel.

12 Claims, 1 Drawing Sheet

(51) Int. Cl.
  *B01J 8/00* (2006.01)
  *B01J 8/44* (2006.01)
  *C08F 2/01* (2006.01)
  *B01J 8/18* (2006.01)
  *C08F 10/00* (2006.01)
  *C08J 11/04* (2006.01)
  *C08F 10/02* (2006.01)
  *C08F 10/06* (2006.01)

(52) U.S. Cl.
  CPC  *B01J 8/005* (2013.01); *C08F 2/34* (2013.01); *C08F 10/00* (2013.01); *C08J 11/04* (2013.01); *B01J 2208/00548* (2013.01); *B01J 2208/0061* (2013.01); *B01J 2208/00761* (2013.01); *B01J 2219/00247* (2013.01); *B01J 2219/00254* (2013.01); *Y10S 526/92* (2013.01)
  USPC ............... 526/68; 526/67; 526/920; 422/131

(56) References Cited

U.S. PATENT DOCUMENTS

| | | | |
|---|---|---|---|
| 4,543,399 | A | 9/1985 | Jenkins, III et al. |
| 4,578,879 | A | 4/1986 | Yokoyama et al. |
| 4,803,251 | A | 2/1989 | Goode et al. |
| 4,855,370 | A | 8/1989 | Chirillo et al. |
| 4,933,149 | A | 6/1990 | Rhee et al. |
| 5,026,795 | A | 6/1991 | Hogan |
| 7,807,761 | B2 * | 10/2010 | Chamayou et al. ............. 526/88 |
| 2005/0152816 | A1 | 7/2005 | Kivela et al. |

FOREIGN PATENT DOCUMENTS

| | | |
|---|---|---|
| EP | 0 699 213 | 2/1998 |
| EP | 0 684 871 | 5/1998 |
| EP | 0 707 513 | 9/1998 |
| EP | 0 870 539 | 10/1998 |
| EP | 0 887 379 | 12/1998 |
| EP | 0 887 380 | 12/1998 |
| EP | 0 887 381 | 12/1998 |
| EP | 0 600 414 | 5/1999 |
| EP | 0 696 293 | 5/2000 |
| EP | 0 721 798 | 3/2002 |
| EP | 1 415 999 | 5/2004 |
| EP | 0 991 684 | 1/2006 |
| WO | WO 94/25495 | 11/1994 |
| WO | WO 00/26258 | 5/2000 |
| WO | WO 00/29452 | 5/2000 |
| WO | WO 01/05845 | 1/2001 |
| WO | WO 2005/087361 | 9/2005 |
| WO | WO 2005/087671 | 9/2005 |
| WO | WO 2007/025640 | 3/2007 |

OTHER PUBLICATIONS

Written Opinion of the International Searching Authority mailed Feb. 15, 2013 for International Application No. PCT/EP2012/004779.

International Preliminary Report on Patentability mailed Oct. 24, 2013 for International Application No. PCT/EP2012/004779.

* cited by examiner

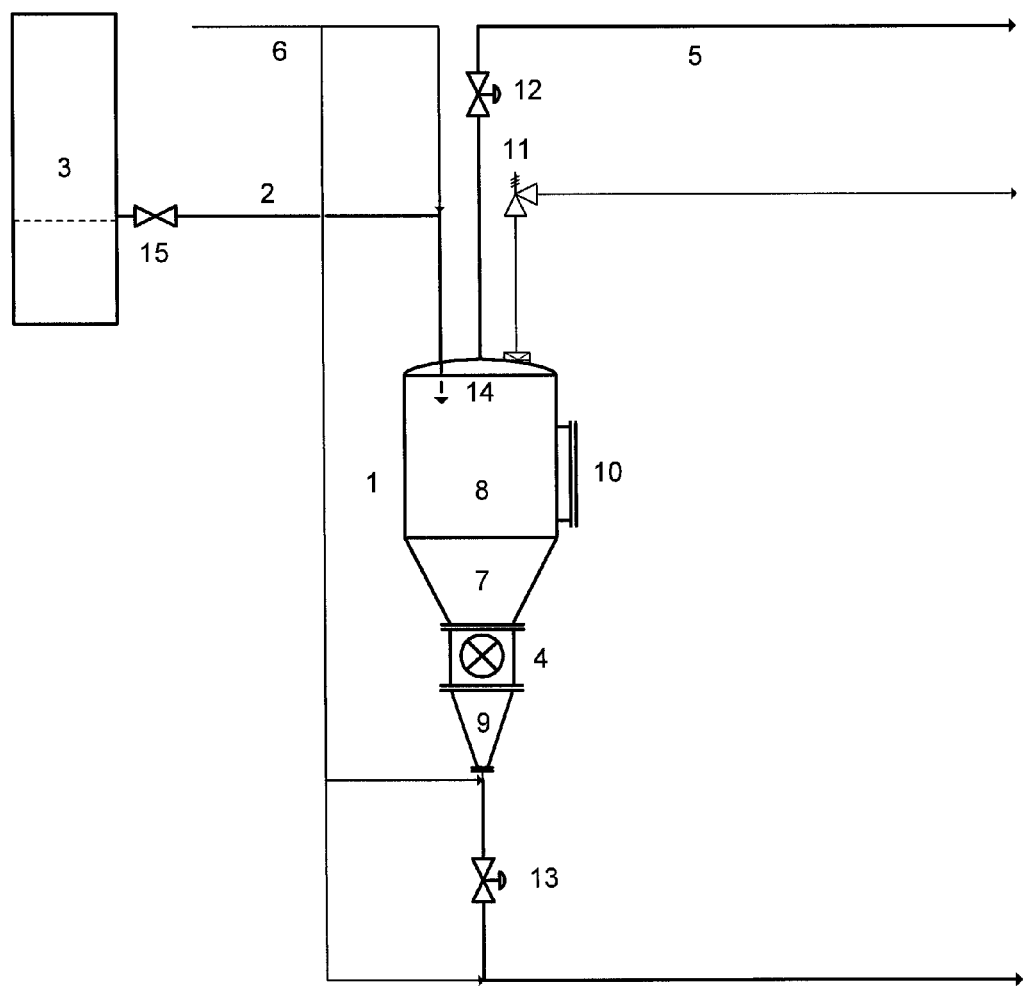

METHOD FOR RECOVERING POLYMER AND APPARATUS THEREFOR

The present invention is generally concerned with a process for recovering polymer including polymeric powder and agglomerates from gas phase reactors. The present invention is further concerned with an apparatus for recovering polymer from a gas phase reactor.

In the production of polymers, particularly in the production of polyolefins such as polyethylenes or polypropylenes using gas phase reactors, the by-production of polymeric agglomerates often denoted as chunks and lumps sometimes cannot be fully suppressed. This is particularly a problem when producing very high melt flow rate grades, grades with very low density and grades with higher comonomer amounts.

Usually the removal of the polymeric particles and the polymeric agglomerates is effected separately. This is usually achieved by sieves mounted at the outlet or discharging pipe. Such sieves have the disadvantage that chunks tend to completely plug the sieve and insofar block the discharging pipe. Cleaning leads to process disturbance or even plant shutdown.

WO0029452 discloses a discharging apparatus, whereby the polymeric material is discharged from a gas phase reactor via a continuously operated discharge system comprising an outlet nozzle, a control valve and a bed level indicator. In one embodiment, polymer agglomerates are withdrawn via this discharge system together with the polymer particles.

However, there are still problems with such discharging apparatus. A first problem pertains blocking within the discharging pipe. Further the separate removal of agglomerates unnecessarily limits flexibility of operation and requires the presence of additional vessels and equipment. Third, various processes known in the art do not guarantee stability of the bed level in the gas phase reactor leading to variation of the process conditions which in the long run, deteriorates polymer quality. Thus, there is still the need for an integrated process and apparatus for the recovery of polymer from the gas phase reactor.

SUMMARY OF THE INVENTION

The present invention is based on the finding that higher production stability and insofar better space time yield can be achieved when a an process and apparatus for recovering polymer from a gas phase reactor is used, whereby the gas phase reactor is connected to an outlet vessel via a feed pipe and a return gas line, whereby the outlet vessel is equipped with means for breakup of polymer agglomerates and whereby the polymeric material is continuously discharged from the gas phase reactor, whereby the flow through the feed pipe is controlled by controlling the flow rate through the return gas line from the outlet vessel to the gas phase reactor, and/or by controlling the outlet rate of polymer product from the outlet vessel.

The present invention insofar provides a process for recovering polymer from a gas phase reactor, the gas phase reactor having a distribution plate and being connected to an outlet vessel via a feed pipe and a return gas line, the outlet vessel comprising at least one apparatus for the breakup of polymeric agglomerates, the process comprising:
  continuously discharging polymeric material from the gas phase reactor via the feed pipe to the outlet vessel,
  passing the polymeric material into the at least one apparatus for breakup of polymeric agglomerates,
  recovering polymer from the outlet vessel, whereby
  the bed level height in the gas phase reactor and the flow through the feed pipe are controlled by, controlling the flow rate through the return gas line from the outlet vessel to the gas phase reactor, and/or by
  controlling the outlet rate of polymer product from the outlet vessel.

The present invention further provides an apparatus for recovering polymer, the apparatus comprising:
  a gas phase reactor having a distribution plate,
  an outlet vessel comprising at least one apparatus for the breakup of polymeric agglomerates and an outlet for the polymer,
  a feed pipe connecting the gas phase reactor and the outlet vessel a return gas line connecting the gas phase reactor and the outlet vessel,
  means for varying the flow rate through the return gas line from the outlet vessel to the gas phase reactor, and
  means for varying the outlet rate of polymer product from the outlet vessel.

DEFINITIONS

Polymeric material includes both polymer particles and polymeric agglomerates. Polymer particles are the direct polymerization product and are usually further processed downstream of the apparatus according to the present invention. Polymeric agglomerates often are denoted chunks and/or lumps and are formed due to inhomogeneous reaction conditions.

Polymer or polymer product denotes the material discharged from the outlet vessel. This material includes polymer powder and crushed polymer agglomerates.

The outlet vessel according to the present invention can be any vessel suitable for collecting the polymeric material discharged from the gas phase reactor.

The effective diameter of the distribution plate is the diameter of the distribution plate when the distribution plate is a circular distribution plate. When the distribution plate is non-circular, for example elliptic, the effective diameter is the diameter a circular distribution plate having same cross-sectional area would have.

In the inventive process the bed level height in the gas phase reactor and the flow through the feed pipe are controlled. The term "controlled" means that the two parameters bed level height and flow through the feed pipe are monitored during the process and kept within certain limits.

The control of the bed level height and flow through the feed and also variation thereof is effected by controlling the flow rate through the return gas line from the outlet vessel to the gas phase reactor, and/or by controlling the outlet rate of polymer product from the outlet vessel. Again the term "controlling" denotes both the monitoring and variation thereof.

Continuously discharging polymeric material means that there is an open connection through which the polymer can flow which is interrupted to less than 1.0 percent with respect to the time of operation. Usually the interruption will be be less than 10 seconds for one hour time of operation. A person skilled in the art will understand that such occasional short interruptions of the flow for a time period of a couple of seconds per hour at most, due to, for instance, the operation of the control valve do not give rise to qualify the discharging discontinuous.

As a matter of definition, the term "continuously discharging polymeric material" includes the situation of oscillating flow for example between two extremes. Apart from the specific exception described above, the flow always must be above zero. "Continuously discharging polymeric material"

insofar differentiates from an intermittent mode where the flow of the polymeric material becomes zero for substantial amounts of time, e.g. 20 minutes closed, 20 minutes open.

Apparatus for breakup of polymeric agglomerates are known in the art and are often denoted lump crushers.

According to the present invention, the outlet(s) from the gas phase reactor are preferentially not higher than about ¼ of the diameter of the distribution plate. By "position" is meant the centre point of the outlet pipe measured from the upper edge of the distribution plate.

Flow rate denotes the amount of material per time passing for example the feed pipe or the return gas line.

Connecting passage denotes the whole passageway from the gas phase reactor to the outlet vessel. The connecting passage includes the feed pipe but also the outlet directly located at the gas phase reactor, optional monitoring means, optional controlling means and the inlet directly located at the outlet vessel.

The "distribution plate" is often also referred to as "fluidization grid".

General Aspects

Polymeric agglomerates generally cannot be fully avoided. This is particularly true when producing high melt flow rate grades and grades with very low density.

The present invention allows the operation of gas phase reactors with high throughput and outstanding operational stability. The operational stability allows skipping manual intervention over several months of polymer production.

Moreover, the present invention avoids the need for a high number of outlet vessels. The indirect control of the flow rate through the feed pipe by controlling the flow rate through the return gas line from the outlet vessel to the gas phase reactor, and/or by controlling the outlet rate of polymer product from the outlet vessel allows a continuous process and further ensures less risk of blocking.

The present invention further allows the production of optimized polymer quality as the operation conditions are more constant.

Process

The present invention further pertains to a process for recovering polymer from a gas phase reactor including a distribution plate into an outlet vessel via a feed pipe. The preferred embodiments and features described later for the apparatus also apply for the process.

In the inventive process, the flow from the gas phase reactor to the outlet vessel is interrupted to less than 1.0 percent with respect to the time of operation, preferably is interrupted to less than 0.5 percent, most preferably to less than 0.25 percent with respect to the time of operation. 0.25 percent with respect to the time of operation translates into an interruption of 9 seconds per hour of operation.

According to the invention, the gas phase reactor bed level is adjusted by controlling the flow rate through the return gas line from the outlet vessel to the gas phase reactor, and/or by controlling the outlet rate of polymer product from the outlet vessel. The measures in practice are self explaining for a skilled person.

According to the invention the gas phase reactor and the outlet vessel are preferably connected by a connecting passage including the feed pipe, wherein the connecting passage allows the transport of agglomerates having a maximum three dimensional diameter of 30 cm. In other words, the connecting passage preferably does not include any obstacles for agglomerates having a maximum three dimensional diameter of 30 cm. According to the present invention, the process is preferably operated without any sieve within the connecting passage and, optionally without any sieve within the outlet vessel, more preferably without any sieve within the connecting passage and the outlet vessel. It is self explaining that the gas phase reactor should not contain a sieve at the outlet for the polymeric material.

Contrary to numerous processes described in the prior art, the process according to the present invention the polymeric material discharged from the gas phase reactor comprises polymer powder and polymer agglomerates. A person skilled in the art will understand that polymer agglomerates will be quite rare and the process will allow discharging of pure polymer powder over a substantial time. However, it is well known that the formation of polymer agglomerates cannot be fully avoided. If present, these agglomerates are discharged together with the polymer powder.

Flush gas may be used to enhance transport of the polymeric material from the gas phase reactor to the outlet vessel.

In the process according to the present invention, the polymeric material pass means for crushing agglomerates before being discharged from the outlet vessel. These means may not be operated all the time but may be operated depending on the needs, i.e. the presence of polymer agglomerates.

Moreover, the average mean residence time of polymeric material in the outlet vessel is less than 60 seconds. The average mean residence time is, as it is well known in the art, the volume of the polymer in the outlet vessel divided by the volumetric outflow rate of the polymer, i.e. $V_p/Q_o$, where $V_p$ is the average volume of the polymer bed in the outlet vessel and $Q_o$ is volumetric exit rate of the polymer. This negligible residence time in the outlet vessel reduces the risk of forming inhomogeneous polymer in the outlet vessel.

The process according to the present invention preferentially is concerned the recovery of polyethylene and/or polypropylene homo- or copolymers. More preferably the process according to the present invention pertains to the recovery of polyethylene copolymers composed of ethylene and $C_3$ to $C_{12}$ alpha olefin monomers including mixtures thereof. Alternatively the process according to the present invention preferably pertains to the production of polypropylene copolymers composed of propylene and alpha olefins selected from the group of ethylene, $C_4$ to $C_{12}$ alpha olefin monomers.

More preferably, the inventive process is concerned with the production of polyethylene homo- or copolymers having a density of below 925 kg/m³. The inventive process is particularly suitable for the production of polyethylene having a melt flow rate (21.6 kg load, ISO 1133, 190° C.) of 2 g/10 min or higher, more preferably 10 g/10 min or higher and most preferably 20 g/10 min or higher and polypropylene homo- or copolymers having a melt flow rate (2.16 kg load, ISO 1133, 230° C.) of 20 g/10 min or higher.

Apparatus

All preferred embodiments as disclosed for the process apply also for the apparatus and vice versa.

The apparatus according to the present invention preferably has a feed pipe which is connected to the gas phase reactor above the distribution plate at a position no higher than ¼, more preferably at a position no higher than ⅙, most preferably at a position no higher than ⅛ of the effective diameter of the distribution plate measured from the distribution plate in vertical direction. By "position" is here meant the centre point of the feed pipe measured from upper edge of the distribution plate. The feed pipe is preferentially only connected to the gas phase reactor in the lower part as described above. However, in a second embodiment it is possible that there is a bypass connecting the feed pipe or outlet vessel with another outlet at the gas phase reactor at a higher position, for instance at a level from 0.25 to 1.0, more preferably from 0.5 to 1.0, even more preferably from 0.5 to 0.9 times the total height of the fluidized bed above the level of the distribution plate. Typically, such an outlet at a higher level withdraws only polymer powder and no agglomerates.

The inner diameter of the feed pipe is preferably 30 cm or less, more preferably 25 cm or less, most preferably 20 cm or less. The inner diameter of the feed pipe is preferably at least 10 cm, more preferably at least 12.5 cm.

In the apparatus according to the present invention, the gas phase reactor and the outlet vessel are preferably connected by a connecting passage including the feed pipe, wherein the connecting passage allows the transport of agglomerates having a maximum three dimensional diameter of 30 cm. The connecting passage of the apparatus according to the present invention preferably does not contain a sieve and, optionally, the outlet vessel according to the present invention does not contain a sieve, more preferably the connecting passage of the apparatus according to the present invention and the outlet vessel of the apparatus according to the present invention do not contain a sieve. It is self explaining that the gas phase reactor should not contain a sieve at the outlet for the polymeric material.

The connecting passage comprises all attachments between gas phase reactor and outlet vessel, such as usually contained adjustable valves or the like. It should be understood that the requirements of allowing agglomerate transport having a maximum three dimensional diameter of 30 cm refers to open valves (which may be incorporated for maintenance purposes and the like). The present invention insofar is in contrast to conventional apparatus used for continuous withdrawal. Such apparatus are usually equipped with a sieve which is usually located directly at the outlet from the gas phase reactor. The sieve ensures the separation of the polymeric agglomerates. However, blocking is likely to occur in such conventional apparatus which requires manual interference or the use of a flush gas. The latter causes problems due to disturbance of the reaction conditions in the gas phase reactor. In order to avoid such problems with the plugging of sieves or disturbance of the reaction conditions, intermittent withdrawal has been used. However, intermittent withdrawal leads to limitations as to production rate and quality.

The apparatus according to the present invention preferably includes an outlet vessel having at least one crusher for agglomerates. Such crushers are known in the art and should be pressure and flammable-gases rated.

Moreover, the apparatus according to the present invention has a return gas line connecting the outlet vessel and the gas phase reactor. This return gas line preferably connects to the gas phase reactor in the upper part of the gas phase reactor. More preferably, the return gas line connects to the gas phase reactor in a height of more than 80%, more preferably more than 85% of the total height of the gas phase reactor measured from the distribution plate to the top. The return gas line preferably connects to the gas phase reactor above the level of the fluidized bed.

The apparatus according to the present invention is further equipped with means for varying the flow rate through the return gas line from the outlet vessel to the gas phase reactor, and means for varying the outlet rate of polymer product from the outlet vessel.

Means for varying the flow rate through the return gas line from the outlet vessel to the gas phase reactor preferably comprise an adjustable valve and preferably a control unit, which may by a central control unit. The means for varying the outlet rate of polymer product from the outlet vessel preferably comprise an adjustable valve and a control unit, which may again be a central control unit.

Moreover, in yet a further preferred embodiment, means for flushing the feed pipe connecting the gas phase reactor and the outlet vessel or means for flushing parts of this feed pipe can be incorporated. Such means for flushing can enhance transport of the polymeric material from the gas phase reactor to the outlet vessel.

The outlet vessel preferably has a bottom part with a smaller effective diameter than the main part of the outlet vessel having the highest effective diameter. The means for crushing of the agglomerates are preferably located in the bottom part.

The return gas line is preferably connected to the outlet vessel at the top part. The top part of the outlet vessel preferably has a lower effective diameter than the main part.

Use

The present invention is further concerned with the use of an apparatus as described above for the production of polyethylene and/or polypropylene homo- or copolymers. More preferably the use pertains to the production of polyethylene copolymers composed of ethylene and $C_3$ to $C_{12}$ alpha olefin monomers including mixtures thereof. Alternatively the use preferably pertains to the production of polypropylene copolymers composed of propylene and alpha olefins selected from the group of ethylene, $C_4$ to $C_{12}$ alpha olefin monomers.

Even more preferably the use pertains to the production of polyethylene homo- or copolymers having a density of below 925 kg/m³.

The present invention is further concerned with the use of the apparatus for the production of polyethylene(s) having a melt flow rate (21.6 kg load, ISO 1133, 190° C.) of 2 g/10 min or higher, more preferably 10 g/10 min or higher and most preferably 20 g/10 min or higher and the production of polypropylene homo- or copolymer(s) having a melt flow rate (2.16 kg load, ISO 1133, 230° C.) of 20 g/10 min or higher.

When producing such polymers the removal of the polymer agglomerates is particularly advantageous as the formation thereof is extremely difficult or even impossible.

BRIEF DESCRIPTION OF THE DRAWING

The drawing schematically shows the apparatus according to the present invention in a specific embodiment. The gas phase reactor having a distribution plate is not shown as this part is well known in the prior art. The drawing inter alia shows an outlet vessel, a feed pipe having a 6" inner diameter, means for flushing substantial parts of the feed pipe, two lump crushers, an outlet for the final material and a return gas line to the gas phase reactor.

DETAILED DESCRIPTION OF THE INVENTION

According to the present invention, the inventive apparatus and method is used for recovering polymer from a gas phase reactor, whereby the gas phase reactor is preferably operated continuously. At least one olefin monomer is polymerized in the gas phase reactor, preferably a fluidized bed gas phase reactor.

In the fluidized bed gas phase reactor an olefin is polymerized in the presence of a polymerization catalyst in an upwards moving gas stream. The reactor typically contains a fluidized bed comprising the growing polymer particles containing the active catalyst located above a distribution plate.

The polymer bed is fluidized with the help of the fluidization gas comprising the olefin monomer, eventual comonomer(s), eventual chain growth controllers or chain transfer agents, such as hydrogen, and eventual inert gas. The fluidization gas is introduced into an inlet chamber at the bottom of the reactor.

To make sure that the gas flow is uniformly distributed over the cross-sectional surface area of the inlet chamber the inlet pipe may be equipped with a flow dividing element as known in the art, e.g. U.S. Pat. No. 4,933,149 and EP-A-684871. One or more of the above-mentioned components may be continuously added into the fluidization gas to compensate for losses caused, among other, by reaction or product withdrawal.

From the inlet chamber the gas flow is passed upwards through a distribution plate into the fluidized bed. The purpose of the distribution palte is to divide the gas flow evenly through the cross-sectional area of the bed. Sometimes the distribution plate may be arranged to establish a gas stream to sweep along the reactor walls, as disclosed in WO-A-2005/087361. Other types of distribution plate are disclosed, among others, in U.S. Pat. No. 4,578,879, EP 600414 and EP-A-721798. An overview is given in Geldart and Bayens: The Design of Distributors for Gas-fluidized Beds, Powder Technology, Vol. 42, 1985.

The fluidization gas passes through the fluidized bed. The superficial velocity of the fluidization gas must be higher that minimum fluidization velocity of the particles contained in the fluidized bed, as otherwise no fluidization would occur. On the other hand, the velocity of the gas should be lower than the onset velocity of pneumatic transport, as otherwise the whole bed would be entrained with the fluidization gas. The minimum fluidization velocity and the onset velocity of pneumatic transport can be calculated when the particle characteristics are know by using common engineering practise. An overview is given, among others in Geldart: Gas Fluidization Technology, J. Wiley & Sons, 1986.

When the fluidization gas is contacted with the bed containing the active catalyst the reactive components of the gas, such as monomers and chain transfer agents, react in the presence of the catalyst to produce the polymer product. At the same time the gas is heated by the reaction heat.

The unreacted fluidization gas is removed from the top of the reactor and cooled in a heat exchanger to remove the heat of reaction. The gas is cooled to a temperature which is lower than that of the bed to prevent the bed from heating because of the reaction. It is possible to cool the gas to a temperature where a part of it condenses. When the liquid droplets enter the reaction zone they are vaporised. The vaporisation heat then contributes to the removal of the reaction heat. This kind of operation is called condensed mode and variations of it are disclosed, among others, in WO-A-2007/025640, U.S. Pat. No. 4,543,399, EP-A-699213 and WO-A-94/25495. It is also possible to add condensing agents into the recycle gas stream, as disclosed in EP-A-696293. The condensing agents are non-polymerizable components, such as n-pentane, isopentane, n-butane or isobutane, which are at least partially condensed in the cooler.

The gas is then compressed and recycled into the inlet chamber of the reactor. Prior to the entry into the reactor fresh reactants are introduced into the fluidization gas stream to compensate for the losses caused by the reaction and product withdrawal. It is generally known to analyze the composition of the fluidization gas and introduce the gas components to keep the composition constant. The actual composition is determined by the desired properties of the product and the catalyst used in the polymerization.

The catalyst may be introduced into the reactor in various ways, either continuously or intermittently. Among others, WO-A-01/05845 and EP-A-499759 disclose such methods. Where the gas phase reactor is a part of a reactor cascade the catalyst is usually dispersed within the polymer particles from the preceding polymerization stage. The polymer particles may be introduced into the gas phase reactor as disclosed in EP-A-1415999 and WO-A-00/26258. Especially if the preceding reactor is a slurry reactor it is advantageous to feed the slurry directly into the fluidized bed of the gas phase reactor as disclosed in EP-A-887379, EP-A-887380, EP-A-887381 and EP-A-991684.

The top part of the gas phase reactor may include a so called disengagement zone. In such a zone the diameter of the reactor is increased to reduce the gas velocity and allow the particles that are carried from the bed with the fluidization gas to settle back to the bed.

The bed level may be observed by different techniques known in the art. For instance, the pressure difference between the bottom of the reactor and a specific height of the bed may be recorded over the whole length of the reactor and the bed level may be calculated based on the pressure difference values. Such a calculation yields a time-averaged level. It is also possible to use ultrasonic sensors or radioactive sensors. With these methods instantaneous levels may be obtained, which of course may then be averaged over time to obtain a time-averaged bed level.

Also antistatic agent(s) may be introduced into the gas phase reactor if needed. Suitable antistatic agents and methods to use them are disclosed, among others, in U.S. Pat. No. 5,026,795, U.S. Pat. No. 4,803,251, U.S. Pat. No. 4,532,311, U.S. Pat. No. 4,855,370 and EP-A-560035. They are usually polar compounds and include, among others, water, ketones, aldehydes and alcohols.

The reactor may also include a mechanical agitator to further facilitate mixing within the fluidized bed. An example of suitable agitator design is given in EP-A-707513.

Typically the fluidized bed polymerization reactor is operated at a temperature within the range of from 50 to 100° C., preferably from 65 to 90° C. The pressure is suitably from 10 to 40 bar, preferably from 15 to 30 bar.

One preferred way of establishing continuously discharge of polymeric material or in other words continuous flow is by using a continuously operated control valve. As described above, the continuously operated control valve is preferably located in the return gas line connecting the outlet vessel and the gas phase reactor.

The position of the control valve is continuously adjusted so that the flow passing the valve is either reduced or increased according to the control signal from the controller. By "continuously operated" control valve and "continuous adjustment" of the position of the valve it is meant that when in operation the valve may assume any position between the fully open and fully closed positions, whereby the "fully closed" position is limited to less than 1 percent of the time of operation, preferably less than 0.5 percent of the time of operation, most preferably less than 0.25 percent of the time of operation. 0.25 percent with respect to the time of operation translates into an interruption of 9 seconds per hour of operation.

Typically the valve is operated so that its position is within the range of from 10 to 90% open, preferably from 20 to 80% open, during the whole operation of the process. However, as explained above, occasionally the position of the valve may be outside the above-mentioned limits for very limited amount of time.

For the intermittent flow as very common the art, the valve is operated in a discrete manner so that it is almost always either fully open or fully shut, i.e., it is either 0% open or 100% open.

Most preferably the gas phase reactor and the outlet vessel are connected via an open conduit. By "open conduit" is here meant a conduit which may contain valves but the valves are during the operation in open position. This then allows a continuous flow of polymer through the conduit. When the pressure difference is increased the flow increases and when the pressure difference is decreased the flow decreases. A person skilled in the art will understand that the pressure difference can be controlled, for instance, by adjusting the gas flow out of one of the vessels.

The polymer may be withdrawn through one or more outlets from the fluidized bed. However, as agglomerates may be formed in the reactor the feed pipe is preferably connected to the gas phase reactor above the distribution plate at a position no higher than ¼, more preferably at a position no higher than ⅙, most preferably at a position no higher than ⅛ of the effective diameter of the distribution plate measured from the distribution plate in vertical direction. By "position" is here meant the centre point of the feed pipe measured from upper edge of the distribution plate. The feed pipe is preferentially only connected to the gas phase reactor in the lower part as described above.

However, in a second embodiment it is possible that there is a bypass connecting the feed pipe or outlet vessel with another outlet at the gas phase reactor at a higher position, for instance at a level from 0.25 to 1.0, more preferably from 0.5 to 1.0, even more preferably from 0.5 to 0.9 times the total height of the fluidized bed above the level of the distribution plate. Typically, such an outlet at a higher level withdraws only polymer powder and no agglomerates.

If agglomerates are formed in the reactor they are conveniently removed from the reactor through the outlet located at the level of the distribution plate before they grow too large. To prevent the agglomerates from disturbing the downstream process they are advantageously crushed at the lower part of the outlet vessel.

Lump crushers are provided, among others, by Atlantic Coast Crushers, Aurora™ crushers by Stedman, and Klausen.

The present invention is now described with respect to the drawing. Reference numbers are used as follows:
  1 outlet vessel
  2 feed pipe connecting the gas phase reactor and the outlet vessel
  3 gas phase reactor
  4 crushers for agglomerates
  5 return line
  6 means for flushing
  7 bottom part of the outlet vessel
  8 main part of the outlet vessel
  9 outlet
  10 manhole
  11 safety valve
  12 means for controlling outlet rate in the return line
  13 means for controlling outlet rate from the outlet vessel
  14 top part of the outlet vessel
  15 adjustable valve (within feed line)

The present invention is concerned with an apparatus for recovery of polymer from a gas phase reactor, the gas phase reactor having a distribution plate, the apparatus comprising: an outlet vessel 1, a feed pipe 2 connecting the gas phase reactor and the outlet vessel.

The outlet vessel according to the present invention preferably has a main part 8 and a bottom 7 part and a top part. As a matter of definition, the main part 8 is the part which has the highest effective diameter, whereas the bottom part 7 is the part which has lower effective diameter than the main part 8. The top part 14 merely is a closure of the outlet vessel.

According to the present invention, feed pipe 2 is connected to the gas phase reactor above the distribution plate. In the apparatus shown in the drawing, the feed pipe has (150 mm) inner diameter. The feed pipe 2 forms the connection passage which also includes the outlet at the gas phase reactor, the inlet at the outlet vessel and all attachments in between. The drawing shows an adjustable valve 15 which is fully open during operation. The apparatus can be operated such that the gas phase reactor bed level is adjusted by control of the outlet rate through return line 5. This control is effected via the means 12 for controlling the outlet rate in the return line. Another process variable is the outlet rate from the outlet vessel which is controlled via means 13.

The crushers for agglomerates 4 are located in the bottom part 7 of the outlet vessel 1.

The drawing also shows means 6 for flushing parts of the feed pipe 2. These means allow enhancing transport of the polymeric material from the gas phase reactor to the outlet vessel.

The apparatus shown in the drawing further comprises a manhole 10 for cleaning and a safety valve 11.

EXAMPLES

A fluidized bed gas phase reactor was operated at a temperature of 85° C. and a pressure of 20 bar. The bed level within the reactor was controlled at 15 m height above the distribution plate.

Polymer containing active catalyst was transferred from a loop reactor into the gas phase reactor at a rate of 6 tons per hour. The polymer was a copolymer of ethylene with 1-butene having a melt index $MFR_2$ of 300 g/10 min and a density of 950 kg/m$^3$.

Additional ethylene, hydrogen, 1-butene comonomer and propane and nitrogen as inert gas were introduced into the gas phase reactor. The conditions were kept such that the polymer production rate in the gas phase reactor was 8 tons per hour and the final bimodal polymer had an $MFR_{21}$ of 20 g/10 min and a density of 922 kg/m$^3$.

The polymer was withdrawn at a rate of 14 tons per hour through the equipment according to the drawing. The polymer was continuously withdrawn from the fluidized bed into the outlet vessel. The gas was returned from the outlet vessel into the gas phase reactor via a return gas line above the level of the fluidized bed.

In the vessel the polymer moved downwards by gravity through the lump crusher where the eventual chunks were crushed. Thereafter the polymer was processed downstream including purging and extrusion. The polymerization, the polymer withdrawal and the product transfer and the downstream equipment could be operated in a stable fashion for a period of several weeks without any need for intervention.

After 8 weeks, grade changes were made and the test were repeated with the production of resins having an $MFR_{21}$ of 10, 35 and 50 g/10 min. Densities varies from 922 to 953 kg/m$^3$. The tests lasted several months. Also during this period the product withdrawal worked without problems. No plugging was observed neither in the apparatus for discharging the polymer nor in the downstream equipment.

COMPARATIVE EXAMPLE

The fluidized bed gas phase reactor of Example 1 was equipped with a similar outlet system as described in FIG. 2 of WO-A-00/29452. The same polymer was produced as in Example 1, having an $MFR_{21}$ of 20 g/10 min and a density of 922 kg/m$^3$.

The outlet system comprised a sieve within the outlet vessel. During the production campaign of four weeks the sieve was plugged a couple of times, requiring the outlet to be switched to a spare system and the sieve to be cleaned manually.

The examples thus show that the present invention allows stable and problem-free operation without manual intervention even when producing resins having a low density. Further, the present invention has a simple construction and does not require a big number of outlet vessels, leading to a low investment cost.

The invention claimed is:

1. A process for recovering polymer from a gas phase reactor (3), the gas phase reactor (3) having a distribution plate and being connected to an outlet vessel (1) via a feed pipe (2) and a return gas line (5), the outlet vessel (1) comprising at least one apparatus for the breakup of polymeric agglomerates (4), whereby the gas phase reactor (3) and the outlet vessel (1) are connected by a connecting passage including the feed pipe (2), wherein the connecting passage allows the transport of agglomerates having a maximum three dimensional diameter of 30 cm and whereby the connecting passage (2) and the outlet vessel (1) are not equipped with a sieve,
the process comprising:
continuously discharging polymeric material from the gas phase reactor (3) via the feed pipe (2) to the outlet vessel (1),
passing the polymeric material into the at least one apparatus for breakup of polymeric agglomerates (4),
recovering polymer from the outlet vessel (1), whereby the bed level height in the gas phase reactor (3) and the flow through the feed pipe (2) are controlled by controlling the flow rate through the return gas line (5) from the outlet vessel (1) to the gas phase reactor (3), and/or by controlling the outlet rate of polymer product from the outlet vessel (1).

2. Process according to claim 1, wherein the average mean residence time of polymeric material in the outlet vessel (1) is less than 60 seconds, whereby the average mean residence time is $V_P/Q_D$, V, being the average volume of the polymer bed in the outlet vessel and Q, being the volumetric exit rate of the polymer.

3. Process according to claim 1, wherein the polymeric material discharged from the gas phase reactor (3) comprises polymer powder and polymer agglomerates.

4. Process according to claim 1, wherein the polymer recovered from the outlet vessel (1) is a polyethylene and/or polypropylene homo- or copolymers.

5. Process according to claim 1, whereby the polymer recovered from the outlet vessel (1) is a polyethylene homo- or copolymer having a density of below 925 kg/m$^3$.

6. Process according to claim 4, whereby the polyethylene(s) have a melt flow rate (21.6 kg load, ISO 1133, 190° C.) of 2 g/10 min or higher and polypropylene homo- or copolymer(s) have a melt flow rate (2.16 kg load, ISO 1133, 230° C.) of 20 g/10 min or higher.

7. An apparatus for recovering polymer, the apparatus comprising:
a gas phase reactor (3) having a distribution plate,
an outlet vessel (1) comprising at least one apparatus for the breakup of polymeric agglomerates (4) and an outlet (9) for the polymer,
a feed pipe (2) connecting the gas phase reactor (3) and the outlet vessel (1)
a return gas line (5) connecting the gas phase reactor (3) and the outlet vessel (1),
means for varying the flow rate (12) through the return gas line (5) from the outlet vessel (1) to the gas phase reactor (3), and
means for varying the outlet rate (13) of polymer product from the outlet vessel (1),
wherein the gas phase reactor (3) and the outlet vessel (1) are connected by a connecting passage including the feed pipe (2), wherein the connecting passage (2) allows the transport of agglomerates having a maximum three dimensional diameter of 30 cm and wherein the connecting passage (2) and the outlet vessel (1) do not contain a sieve.

8. The apparatus according to claim 7, wherein the feed pipe (2) is connected to the gas phase reactor (3) above the distribution plate in a height less than ¼ of the effective diameter of the distribution plate measured from the upper edge of the distribution plate in vertical direction.

9. Apparatus according to claim 7, whereby the inner diameter of the feed pipe (2) is 30 cm or less and/or whereby the inner diameter of the feed pipe (2) is at least 10 cm.

10. Method for the production of polyethylene and/or polypropylene homo- or copolymer(s) with an apparatus according to claim 7.

11. Method according to claim 10 for the production of polyethylene homo- or copolymer(s) having a density of below 925 kg/m$^3$.

12. Method according to claim 10, whereby the polyethylene(s) have a melt flow rate (21.6 kg load, ISO 1133, 190° C.) of 2 g/10 min or higher and the polypropylene homo- or copolymer(s) have a melt flow rate (2.16 kg load, ISO 1133, 230° C.) of 20 g/10 min or higher.

* * * * *